Patented Jan. 21, 1941

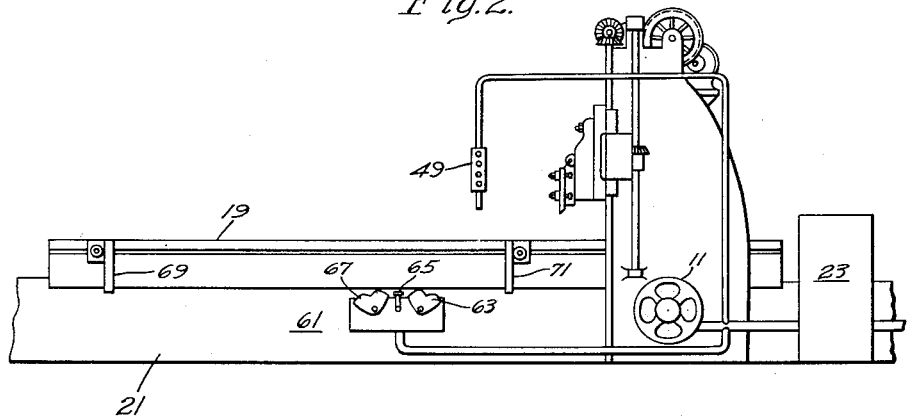
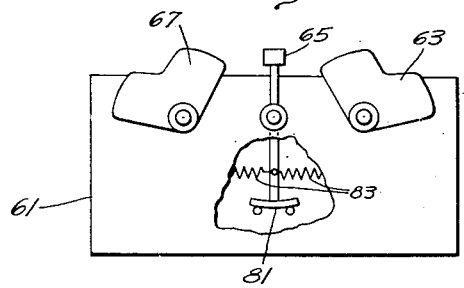

2,229,414

UNITED STATES PATENT OFFICE 2,229,414

CONTROL SYSTEM

George E. King, Wilkinsburg, Pa., assignor to Westinghouse Electric & Manufacturing Company, East Pittsburgh, Pa., a corporation of Pennsylvania Application May 25, 1938, Serial No. 209,971

14 Claims. (Cl. 172—240)

This invention relates to control systems and more particularly to control systems for automatically controlling the operation of reversing motors used to drive reciprocating mechanisms, such as planers, draw-cut shapers, roll grinders, transfer tables, etc.

In planers and similar machine tools, a work carrying table or reciprocating member is reciprocated by a motor with respect to a cutting tool. The motor is controlled by means of a stroke limit switch which in turn is controlled by dogs mounted on the work table. The work may be a costly die to be machined up to a shoulder or a large casting, portions of which are too large to pass certain parts of the machine. Failure of the limit switch to operate may result in damage to the work or to the machine, or injury to the operator.

It is, accordingly, an object of my invention to provide apparatus, in a control system incorporating selective means for reversing a motor, for stopping the motor in event of a failure of the selective means.

Another object of my invention is to provide apparatus, in a control system incorporating selective means for reversing a motor at a predetermined time, for stopping the motor before the predetermined time in event of a failure of the selective means.

Another object of my invention is to provide apparatus, in a control system utilizing a braking effect initiated by selective means, for applying a greater braking effect for stopping a motor within a predetermined limit in event of failure of the selective means.

A more specific object of my invention is the provision of two stopping means for a motor, one for stopping the motor from a given speed and a given rotor position in a substantially predetermined number of revolutions, and the other, normally becoming effective later than the first and after failure of the first to initiate the stopping of the motor, for stopping the motor from the same given speed in substantially the same number of revolutions or a lesser number counting the revolutions from the same given rotor position.

A further object of my invention is to stop a machine element from a given speed to standstill within a given distance of travel from a given point, at which the stopping is normally initiated, even though the stopping operation may be initiated after the machine element has passed said given point.

It is also an object of my invention to provide, in combination with normally used stopping means for an electric motor designed to stop an electric motor from a given speed in a given time interval, apparatus for stopping the electric motor in a lesser interval of time in the event of a failure of the normally used stopping means.

A broad object of my invention is to provide a more rapid rate of retardation of a machine element from a given speed of movement to standstill in the event a slower rate of retardation of the machine element was not previously initiated.

In general, it is an object of my invention to provide apparatus that shall be simple and reliable in operation and adapted for ready and economical manufacture.

In the following discussion, the invention is treated in connection with a planer, and, more particularly, the planer platen, but the invention is not limited in its use to the control of planers, but may be applied generally where rapid reversal of a motor-driven machine is desired.

The novel features that I consider characteristic of my invention are set forth with particularity in the appended claims. The invention itself, however, both as to its organization and its method of operation, together with additional objects, and advantages thereof, will best be understood from the following description of a specific embodiment when read in connection with the accompanying drawings, in which:

Fig. 2 is a view in front elevation of a planer operated by a control system construction in accordance with the present invention; and, Fig. 3 is a view in front elevation of a stroke limit switch constructed in accordance with the present invention, and with parts broken away for clearness.

Figure 1:
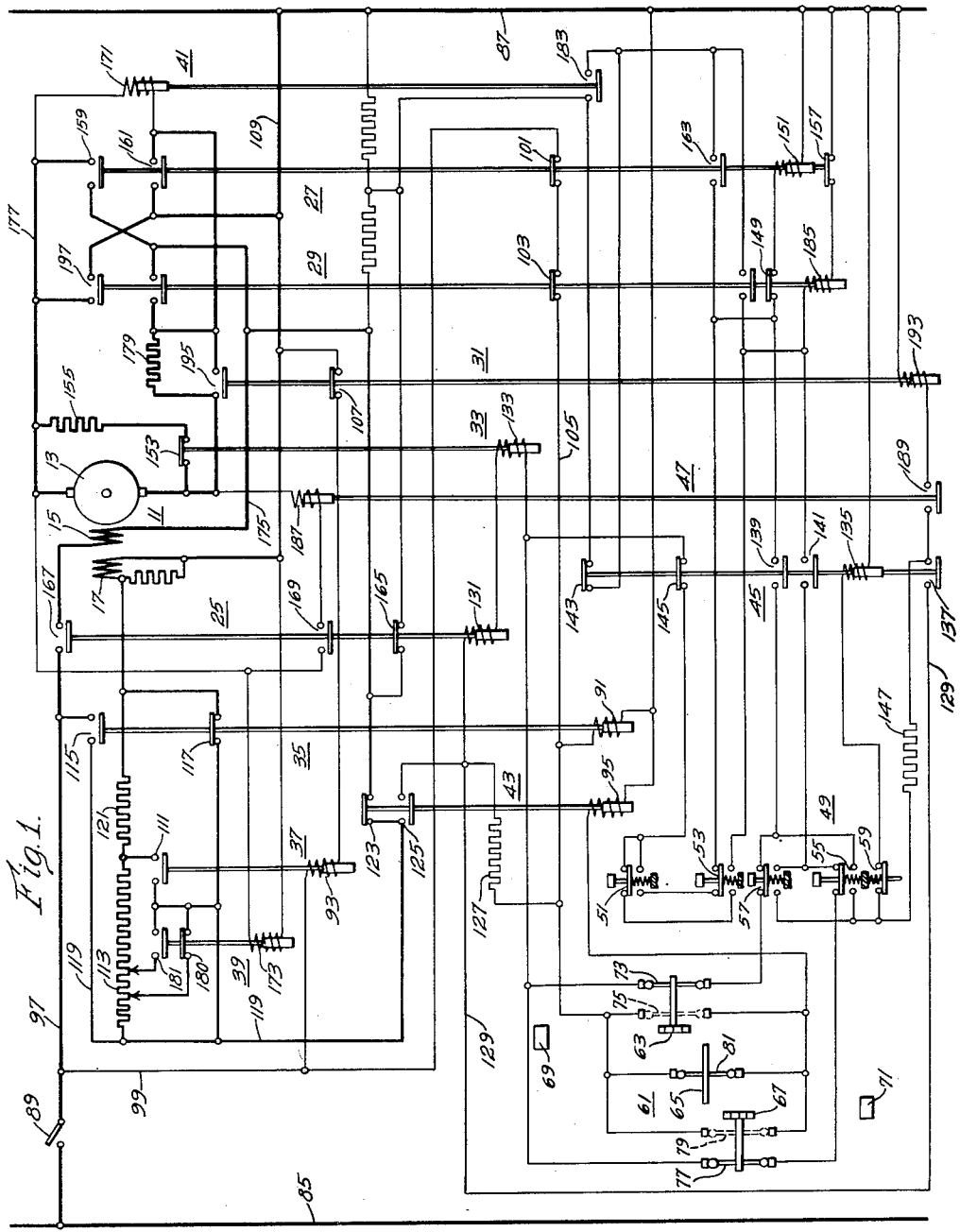
Figure 1 is a diagrammatic view of a system of control organized in accordance with the present invention.

In Fig. 1, motor 11 having an armature 13, a series field winding 15 and a shunt field winding 17 is shown. The motor 11 is utilized for driving a reciprocating member or platen 19 on a planer bed 21 of the planer in Fig. 2. A control cabinet 23 houses electromagnetic devices, utilized for controlling the motor 11, including a main contactor 25, reversing switch 27 and 29, starting switch 31, dynamic braking switch 33, field relays 35, 37 and 39, plugging relay 41 and auxiliary relays 43, 45 and 47.

A pushbutton station or pendant switch 49 from which complete control of the motor is had, includes an inch cut pushbutton switch 51, an inch return pushbutton switch 53, an automatic cut pushbutton 55, an automatic return pushbutton switch 57 and the stop switch 59.

Below the planer platen 19 and at the side of the planer bed 21 is positioned a limit switch 61 having projecting levers 63, 65 and 67. At the side of the platen 19 are positioned a pair of lugs or dogs 69 and 71 which may be adjusted longitudinally of the platen 19 within grooves of T-shape. The dogs and projecting levers are so disposed that the dog 69 engages levers 63 and 65 and the dog 71 engages levers 67 and 65 when the platen is reciprocating.

If it be assumed that the planer platen 19 moves to the right (Fig. 3), or in the cut direction, dog 69 actuates projecting lever 63 which initiates a dynamic-braking effect in the motor to stop the planer platen 19 within a definite distance of travel and, for any given platen speed, within a definite time after actuation of the projecting lever 63. The dog 69 actuates the projecting lever 65 an instant after the actuation of the projecting lever 63. As the planer platen moves to the left, or in the return direction, the dog 69 again actuates the lever 65, and an instant thereafter actuates the lever 63 moving lever 63 to its original position. A similar function is performed by the dog 71 and the projecting levers 67 and 65.

The limit switch 61 is shown diagrammatically in Figs. 1 and 2. The projecting lever 63 is mechanically connected to actuate simultaneously a plurality of sets of contacts, including the cut directional contacts 73 and the auxiliary contacts 75. Similarly, the projecting lever 67 is mechanically connected to actuate simultaneously a plurality of sets of contact members including the return directional contacts 77 and the auxiliary contacts 79. Various contact arrangements well known in the art may be utilized, the essential characteristic of the contacts being that they may be held positively in the open or in the closed position. It will be apparent that projecting levers 63 and 67 are always in a given position, the set position, when the planer platen 19 is in a position intermediate the limits of travel determined by the position selected for the dogs 69 and 71. When projecting levers 63 and 67 are in set position, the directional contacts 73 and 77 are in the circuit closing position, while the auxiliary contacts 75 and 79 are in the circuit opening position.

The projecting lever 65 is mechanically connected to a set of contacts 81 which are biased in the circuit closing position by a pair of differentially connected springs 83. The contacts 81 open when the lever 65 is actuated by either dog 69, or dog 71. It is sufficient that the contacts 81 remain in the circuit opening position only momentarily when the lever 65 is actuated by either dog 69, or dog 71. It will readily be understood that various types of contact members may be utilized such as sliding contacts, or quick make and break contacts.

Electrical energy is supplied to the control system from a pair of energized conductors or buses 85 and 87. Upon closure of a disconnecting switch 89, operating coils 91, 93 and 95 of the relays 35, 37 and 43, respectively, become energized. The circuit for operating coils 91 and 95 may be traced from the energized conductor 85 through the switch 89, conductor 99, contacts 101 of reversing switch 27, contacts 103 of reversing switch 29, conductor 105 where the circuit divides, one branch extending through the operating coil 91 to the energized conductor 87, and another branch extending through the closed contacts 81, the operating coil 95 to the energized conductor 87. It will be noted that the open auxiliary contacts 75 and 79 are connected in parallel circuit relation with the contacts 81. The circuit for operating coil 93 extends from conductor 99, through operating coil 93, contacts 107 of starting switch 31, conductor 109, to the energized conductor 87. Energization of operating coil 93 actuates field relay 37 to close a set of contacts 111, thus shunting a field rheostat 113.

Energization of operating coil 91 actuates a field relay 35 to open contacts 117 and to close contacts 115. A circuit is thus established for the shunt field winding 17, and it extends from the energized conductor 85, switch 89, conductor 97, contacts 115, conductor 119, contacts 111, resistor 121, field winding 17, conductor 109 to the energized conductor 87.

Energization of the operating coil 95 actuates the auxiliary relay 43 to open contacts 123 and close contacts 125. Thus a holding circuit is established for the operating coils 91 and 95, and it extends from energized conductor 97, contacts 115, conductor 119, contacts 125, resistor 127, conductor 105, from where the circuit continues through operating coils 91 and 95 as hereinabove described.

Assuming that the planer platen is between the limits of travel and the attendant wishes to start the planer platen for automatic operation in the cut direction, the pushbutton 55 is depressed, thereby establishing a circuit from the energized conductor 119, contacts 125, conductor 129, operating coils 131 and 133, directional contacts 73, upper contacts of return pushbutton 57, lower contacts of cut pushbutton 55, stop switch 59, operating coil 135 of auxiliary relay 45 to the energized conductor 87.

Upon the energization of actuating coil 135, contact members 137, 139 and 141 are closed and contact members 143 and 145 are opened. Closure of contacts 137 establishes a holding circuit for operating coil 135 which extends from the energized conductor 129, contacts 137, resistor 147, stop switch 59, operating coil 135, to the energized conductor 87.

Closure of the contacts 139 establishes a circuit which extends from the energized upper contacts of pushbutton 57, to contacts 139, contacts 149, operating coil 151 of directional contactor 27 to the energized conductor 87. Thus the operating coils 131, 133 and 151 become fully energized and actuate substantially simultaneously main contactor 25, dynamic-braking switch 33 and cut reversing switch 27, respectively.

Energization of operating coil 133 thus opens contacts 153 to open the circuit through dynamic braking resistor 155.

Energization of operating coil 151 opens contacts 101 and 157, and closes contacts 159, 161 and 163. Energization of operating coil 131 opens contacts 165 and closes contacts 167 and 169.

Closure of contacts 167, 159 and 161 establishes circuits for energizing armature 13 of motor 11, and operating coils 171 and 173. The motor starts to operate causing the planer platen to move in the cut direction. The circuit for armature 13 extends from the energized conductor 97, contacts 167, series field winding 15, conductor 175, contacts 159, conductor 177, armature 13, starting resistor 179, contacts 161, conductor 109 to the energized conductor 87. The circuit for operating coil 171 continues from conductor 177, through the operating coil 171, contacts 161, conductor 169 to the energized conductor 87. The circuit for the operating coil 173 continues from conductor 177, operating coil 173, conductor 109, to the energized conductor 87.

Energization of operating coil 173 actuates field relay 39 to open contacts 180 and close contacts 181 to preset the rheostat 113 so that the motor 11 may operate at a predetermined speed in the cut direction after the circuit through contacts 111 has been opened.

Energization of operating coil 171 actuates plugging relay to close contacts 183. Closure of contacts 163 and 183 establishes a holding circuit for operating coil 151 to be utilized during certain operations requiring dynamic braking.

Opening of contacts 157 prevents energization of operating coil 185 when the attendant releases the depressed pushbutton 55.

Closure of contacts 169 establishes a circuit across the armature 13 for operating coil 187. When the counter-electromotive of the armature 13 reaches a predetermined value, the operating coil 187 becomes sufficiently energized to actuate auxiliary relay 47 and close contacts 189. A circuit is then completed through operating coil 193 and it extends from conductor 129 through contacts 137, contacts 189, operating coil 193 to the energized conductor 87. Energization of operating coil 193 actuates starting switch 31 thus opening contacts 107 and closing contacts 195.

Opening of contacts 107 causes the deenergization of operating coil 93 and thus the opening of contacts 111 to establish the circuit through the field rheostat 113 as hereinabove explained.

Closure of contacts 195 establishes a shunt circuit across the starting resistor 179. The motor then continues to accelerate to its maximum predetermined speed in the cut direction.

As the planer platen proceeds in the cut direction and approaches the limit of travel for which the dog 69 has been set, projecting lever 63 is tripped, thereby opening directional contacts 73 and closing auxiliary contacts 75. Immediately thereafter the dog 69 actuates lever 65, momentarily opening the circuit through contacts 81. However, the circuit for energizing operating coil 95 of auxiliary relay 43, is maintained by the closure of auxiliary contacts 75.

The opening of directional contacts 73 opens the circuit through operating coils 133 and 131. Deenergization of operating coils 133 actuates dynamic braking switch 33 to close contacts 153 thus establishing a dynamic braking circuit across the armature 13 of motor 11. Deenergization of operating coil 131 actuates contactor 25 to open contacts 167 and 169, and to close contacts 165.

Opening of contacts 167 disconnects the armature 13, and series field winding 15 of motor 11, and operating coils 171 and 173 from the energized conductor 85. Opening of contacts 169 causes the deenergization of operating coil 187 thus causing the opening of contacts 189 and thus the deenergization of operating coil 193 to open contacts 195 and close contacts 107. Closure of contacts 107 causes the actuation of field relay 37 to close contacts 111 thus increasing the current through the shunt field winding 17.

After the actuation of directional contacts 73, the operating coil 151 is maintained in the energized condition by a holding circuit which extends from the upper side of armature 13 through conductor 177, contacts 159, conductor 175, contacts 165, contacts 183, contacts 163, contacts 149, operating coil 151, conductor 87, conductor 109, contacts 161, resistor 179 to the lower side of armature 13. When the potential across armature 13 decreases to a predetermined value, the operating coil 171 of plugging relay actuates contacts 183 to open the above described circuit for operating coil 151.

Deenergization of operating coil 151 actuates reversing switch 27 to open contacts 159, 161 and 163, and to close contacts 161 and 157. Closure of contacts 157 completes the circuit for operating coils 131, 133 and 185 of the main contactor 25, dynamic braking switch 33, and reversing switch 29, respectively. This establishes the circuit for plugging and reversing the direction of rotation of the motor 13 thus causing the planer platen to stop and then move to the left (Fig. 2), or in the return direction. As the planer platen 19 proceeds to the left, dog 69 actuates lever 65 to momentarily open contacts 81. As hereinabove explained, the circuit through the operating coil 95 is maintained by the auxiliary contacts 75. An instant later, the dog 69 actuates lever 63 to close directional contacts 73 and open auxiliary contacts 75.

The operating coil 173 of field relay 39 is shunted by contacts 197 and therefore maintained in the deenergized condition, thus presetting rheostat 113 so that motor 13 may accelerate to a predetermined speed in the reverse direction. The operation of the motor and planer in the return direction is substantially similar to that described for the cut direction; therefore, it is believed unnecessary to the understanding of the invention, to describe this operation. However, it will be noted that as the platen approaches the limit of travel in the return direction, the dog 71 first actuates lever 67 to open directional contacts 77 and close auxiliary contacts 79. Immediately thereafter the dog 71 actuates the lever 65 to momentarily open contacts 81. If auxiliary contacts 79 are closed when contacts 81 are opened, the control system continues to operate in the normal manner as hereinabove explained.

If, during operation in the cut direction, the directional contacts 73 and the auxiliary contacts 75 fail to operate when the dog 69 would normally actuate the projecting lever 63 as hereinabove explained, the motor 11 will continue to rotate at the normal operating speed. Immediately after the dog 69 passes projecting lever 63, it actuates lever 65 to open contacts 81. Because the auxiliary contacts 75 and 79 and the contacts 101 are in the open circuit position, the momentary opening of contacts 81 deenergizes the operating coil 95 thus actuating auxiliary relay 43 to open contacts 125 and close contacts 123. Opening of contacts 125 maintains the operating coil 95 in the deenergized condition and causes the armature 13, series field 15, shunt field 17, and all of the operating coils with the exception of operating coil 93 to become disconnected from the energized conductor 85. However, the shunt field winding 17 is maintained in the energized condition by the closure of contacts 123.

The operating coil 151 is also maintained in the energized condition by the holding circuit hereinabove described except that it will be noted that contacts 143 are now in the closed position, shunting contacts 183 because operating coil 135 was deenergized by the opening of contacts 125. The closing of contacts 143 renders the contacts 183 ineffective, at this time, therefore, the operating coil 151 is maintained in the energized condition after the plugging relay 41 is actuated.

Deenergization of the operating coil 133 actuates the dynamic braking switch 33 to establish the dynamic braking circuit for armature 13 through the contacts 195 and resistor 155.

Upon failure of directional contacts 73 to function, the dynamic braking effect is initiated an instant later than it would have been had the directional contacts 73 functioned. To stop the platen 19 within the limit of travel predetermined by the actuation of projection lever 63 by the dog 69, a relatively stronger dynamic braking effect is necessary. This is accomplished by closure of contacts 117 to shunt the field rheostat 113 and the resistor 121, thus overexciting the shunt field winding 17 at the beginning of the dynamic braking period. The circuit for the shunt field winding 17 now extends from the upper side of armature 13 through conductor 177, contacts 159, conductor 175, contacts 123, conductor 119, contacts 117, shunt field winding 17, conductor 109, contacts 161, starting resistor 179 to the lower side of armature 13.

Once the dynamic braking effect has been initiated by the opening of contacts 81, the motor speed rapidly decreases until both the motor 13 and the platen 19 come to rest. As the motor speed decreases, the potential across the armature 13 decreases, and when it reaches a predetermined value, the operating coil 151 becomes deenergized, thus opening contacts 159, 161 and 163 and closing contacts 101 and 157.

Closure of contacts 101 establishes a circuit for reenergizing operating coils 91 and 95 and shunt field winding 17 as hereinabove described with reference to the closing of the switch 89. When the cause of the failure of the limit switch 61 has been corrected, the motor may again be started by depressing the appropriate pushbutton.

It will be readily understood that upon failure of the directional switch 77 and the auxiliary switch 79 to operate when the lever 67 is actuated by dog 71 when the platen 19 is moving in the return direction, the motor 11 will be stopped in a manner similar to that hereinabove described.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a control system, in combination, means for stopping a motor operating at a given speed in a predetermined interval of time, means responsive to the operation of the motor for stopping the motor prior to the end of said predetermined interval of time in event of a failure of the first named means.

2. In a control system, in combination, means for stopping a motor, operating at a given speed, in a predetermined interval of time, means actuated in response to the operation of the motor subsequent to the first named means for stopping the motor substantially at the end of said predetermined interval of time in event of a failure of the first named means.

3. In a control system, in combination, means for stopping a motor from a given speed in a predetermined interval of time and means operable in response to the motor operation after a failure of the operation of the first named means adapted to stop the motor within the predetermined interval of time.

4. The method of stopping an electric motor connected to a source of power and coupled for driving a reciprocating member upon failure of the member to actuate a directional limit switch normally adapted to stop the motor at a predetermined limit of travel, which comprises, disconnecting the motor from the source of power, and initiating a dynamic-braking effect that will stop the motor within the limit of travel predetermined by the directional limit switch.

5. The method of stopping an electric motor connected to a source of power and coupled for driving a reciprocating member by utilizing emergency stopping means upon failure of the member to actuate a directional limit switch normally adapted to initiate means for stopping and reversing the motor when the member reaches a predetermined limit of travel, which comprises, actuating emergency stopping means subsequent to the normal operating time of the directional limit switch, disconnecting the motor from the source of power, and initiating a dynamic-braking effect on the motor that will stop the member within the limit of travel normally predetermined by the directional limit switch.

6. The method of stopping an electric motor connected to a source of power and coupled for driving a reciprocating member, having emergency stopping means associated therewith upon failure of the member to actuate a directional limit switch normally adapted to initiate a predetermined dynamic-braking effect for stopping the motor when the member reaches a predetermined limit of travel, which comprises, actuating emergency stopping means subsequent to the normal operating time of the directional limit switch, disconnecting the motor from the source of power, and initiating a dynamic-braking effect, stronger than the dynamic braking effect normally initiated by the directional limit switch, on the motor for stopping the member within the limit of travel normally predetermined by the directional limit switch.

7. In a control system for a reciprocating member operated by a reversing motor, a source of power for the motor, control means initiated by the reciprocating member for effecting the reversal of the motor when the said member has reached a predetermined limit of travel, and stopping means, cooperatively associated with the said control means, operated by the said member for stopping the motor before the said member reaches the predetermined limit of travel upon failure of the control means to function in a predetermined manner.

8. In a control system, in combination, a reciprocating member, a motor for driving the member, a source of power for the motor, a main line switch for connecting the motor to the source of power, reversing switches for the motor, directional switches operated by the member for selectively effecting the reversal of the motor, and a limit switch cooperatively associated with the directional switches and operated by the member for stopping the motor upon failure of the directional switches to function in a predetermined manner.

9. In a control system for a machine element, in combination, means for moving the element, stopping means for said element set in operation by said element when in a given position and adapted to stop the element in a given distance of travel beyond said given position, and means, actuated by the said element and operable in the event of failure of the stopping means, adapted to stop the element in substantially the same distance of travel of the element beyond the said given position.

10. In a system of control for an electric motor having a rotor, in combination, means for energizing the motor to cause the rotor to operate at a substantially constant speed, normal stopping means for the rotor set in operation when the rotor in its rotation holds a given position in space and adapted to stop the rotation of the rotor in a given number of revolutions after the rotor holds said given position in space, and emergency stopping means, responsive to the operation of the motor, operable upon failure of the normal stopping means and thus set in operation later, namely, when the rotor in its rotation has moved beyond said given position, adapted to stop the rotor in a number of revolutions that is equal to or less than the difference between the said given number of stopping revolutions of the rotor when stopped by the normal stopping means and the number of revolutions the rotor has made between the time the rotor holds its given position in space and the time the stopping effect of the emergency stopping means is initiated.

11. In a system of control for a machine element, in combination, means for moving the machine element in a given direction toward a limiting position beyond which the machine element is not to move, normal stopping means, set in operation by the machine element when a given distance from the limiting position, adapted to retard the machine element at a given average rate to effect a complete stopping of the machine element at the limiting position, and emergency stopping means, set in operation by the machine element a lesser distance from the limiting position in the event of failure of the normal stopping means, adapted to retard the machine element at a higher average rate to effect a complete stopping of the machine element before movement to the limiting position.

12. The method of stopping an electric motor connected to a source of power upon failure of the motor to actuate control means normally adapted to stop the motor at a predetermined limit of travel, which comprises, disconnecting the motor from the source of power, and initiating a dynamic-braking effect that will stop the motor within the limit of travel predetermined by the control means.

13. In a control system, in combination, means for stopping a motor from a given speed in a predetermined interval of time, an auxiliary switch mechanically coupled to said stopping means, additional stopping means electrically connected to said auxiliary switch and responsive to the operation of the motor for stopping the motor prior to the end of said predetermined interval of time in the event of a failure of the first named means.

14. In a system of control, in combination, stopping means for stopping a motor, operating at a given speed, in a predetermined interval of time after initiation of the stopping operation of the motor by said stopping means, and second stopping means responsive to the operation of the motor, and set in operation prior to the end of said predetermined interval of time for stopping the motor prior to the end of said predetermined interval of time in the event of a failure of the first named stopping means.

GEORGE E. KING.